United States Patent
Jiang

(10) Patent No.: US 7,519,090 B2
(45) Date of Patent: Apr. 14, 2009

(54) VERY HIGH SPEED ARBITRARY NUMBER OF MULTIPLE SIGNAL MULTIPLEXER

(75) Inventor: Bian Jiang, Singapore (SG)

(73) Assignee: Intelligent Design Limited, Ebene (MU)

( * ) Notice: Subject to any disclaimer, the term of this patent is extended or adjusted under 35 U.S.C. 154(b) by 1119 days.

(21) Appl. No.: 10/318,472

(22) Filed: Dec. 13, 2002

(65) Prior Publication Data

US 2004/0114637 A1    Jun. 17, 2004

(51) Int. Cl.
   *H04J 3/02*      (2006.01)
(52) U.S. Cl. ........................... 370/537; 375/376
(58) Field of Classification Search ............ 370/433, 370/503, 516, 517, 518, 519, 532, 535, 537, 370/538; 375/371, 373, 376
See application file for complete search history.

(56) References Cited

U.S. PATENT DOCUMENTS

| | | | | |
|---|---|---|---|---|
| 4,225,964 A | * | 9/1980 | Cagle et al. | 375/332 |
| 4,244,047 A | * | 1/1981 | Perkins | 370/482 |
| 5,598,114 A | | 1/1997 | Jamshidi | 326/113 |
| 5,970,052 A | * | 10/1999 | Lo et al. | 370/241 |
| 6,137,340 A | * | 10/2000 | Goodell et al. | 327/407 |
| 6,194,950 B1 | * | 2/2001 | Kibar et al. | 327/410 |
| 6,239,646 B1 | | 5/2001 | Navabi et al. | 327/407 |
| 6,310,928 B1 | * | 10/2001 | Yunome | 375/376 |
| 6,680,970 B1 | * | 1/2004 | Mejia | 375/225 |
| 6,952,431 B1 | * | 10/2005 | Dally et al. | 370/516 |
| 7,190,754 B1 | * | 3/2007 | Chang et al. | 375/373 |
| 2002/0079938 A1 | * | 6/2002 | Saeki | 327/165 |
| 2002/0122438 A1 | * | 9/2002 | Enam et al. | 370/518 |

* cited by examiner

*Primary Examiner*—Thai D Hoang
(74) *Attorney, Agent, or Firm*—Saile Ackerman LLC; Stephen B. Ackerman

(57) ABSTRACT

This invention provides a circuit and a method for very high-speed multiplexers. It provides a circuit that can produce an arbitrary number of multiple signal multiplexers. It also provides a circuit and a method which converts a parallel data bus into a serial data path. This invention contains an overlapped data generator, which takes in a data bus and outputs even and odd signals to a selective mux. It also contains a selective mux, which receives even and odd internal data bits from said overlapped data generator and which outputs one serial data bit. It also contains a phase locked loop/delay locked loop, PLL/DLL, which receives a set of phase clocks and which outputs five evenly-phase-distributed clock signals to a data select signal generator. Finally, the circuit includes a data select signal generator, which receives said five evenly-phase-distributed clock signals and which generates a ten-bit data select signal bus.

26 Claims, 6 Drawing Sheets

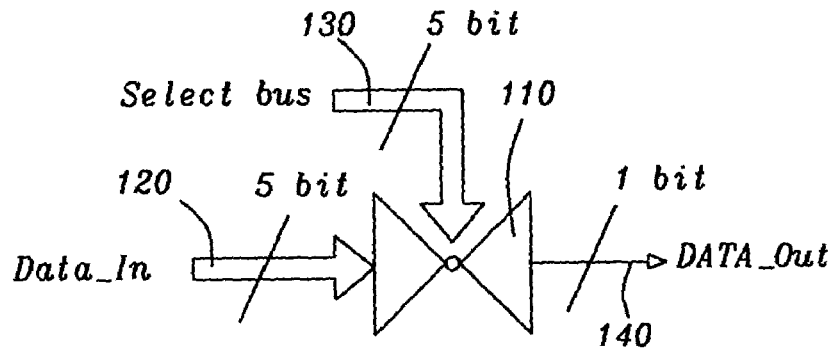
Transmission Gate Implematation
FIG. 1a – Prior Art
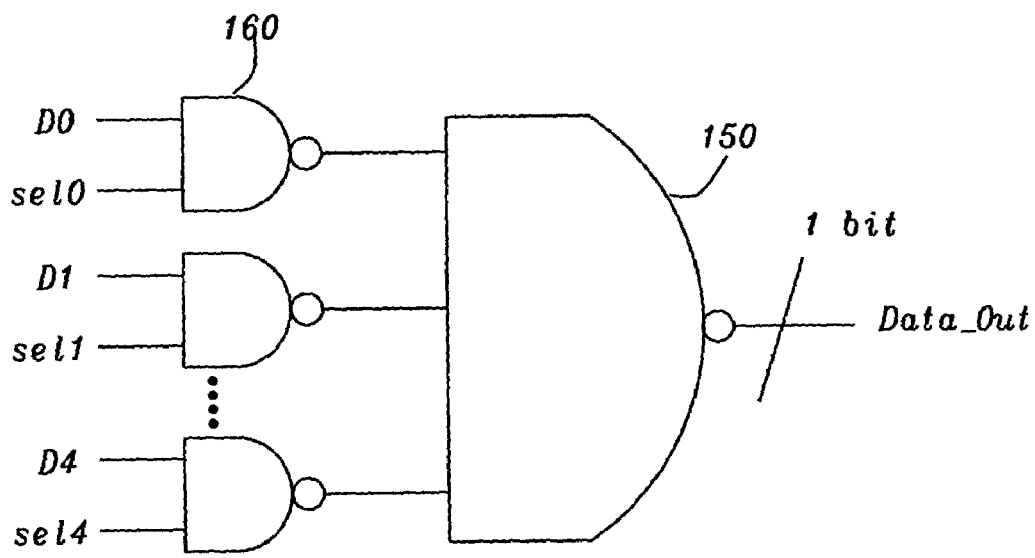
Gate Implementation
FIG. 1b – Prior Art

VERY HIGH SPEED ARBITRARY NUMBER OF MULTIPLE SIGNAL MULTIPLEXER

BACKGROUND OF THE INVENTION

1. Field of the Invention

This invention relates to a circuit and a method for very high-speed multiplexers.

More particularly this invention relates to an arbitrary number of multiple signal multiplexers.

More particularly this invention relates to providing a circuit and a method which converts a parallel data bus into a serial data path.

2. Description of Related Art

The current practice is to use programmable transmission gates to determine which data input (analog or digital signal) is selected to be transmitted to the serial data output. The problem encountered with the prior art is a low and limited data transmission rate. The problems with the transmission gate approach is that parasitic capacitance of multiple gates limits the data speed through the logic gates. The prior art transmission gate design requires careful control of parasitic capacitance, of leakage current and of bus signal collisions.

In addition, the gate level implementation problems of the prior art result in a mismatch between the rise times and fall times of the select signals for the different data paths to be selected. The careful design required to overcome these rise time/fall time mismatches results in degradation of the duty cycle or speed of the serial output of the multiplexer. In order to overcome the rise time/fall time mismatches in the prior art designs, it is required that the system clock have a perfect 50% duty cycle. This is required to avoid glitches between the rise time activation of logic and the fall time activation of logic.

FIG. 1a shows a high level diagram of the prior art multiplexer. The 5-bit data_in bus 120 goes into a transmission gate 110. In addition, a five-bit select bus 130 goes into this transmission gate 110. The serialized, single bit data out 140 comes out of this transmission gate 110.

FIG. 1b shows the gate level implementation of the prior art multiplexer. The parallel data in bus D[4:0] is combined with the data select bus sel [4:0] via NAND gate 160. The five outputs of these NAND gates are combined with a larger, wider NAND gate 150. The output of the wider NAND gate 150 produces the single bit serial output Data Out.

U.S. Pat. No. 5,598,114 (Jamshidi) "High Speed Reduced Area Multiplexer" describes a very high speed multiplexer implemented in a smaller semiconductor area.

U.S. Pat. No. 6,137,340 (Goodell, et al.) "Low Voltage High Speed Multiplexer" shows a low voltage, high speed multiplexer. For a plurality of complementary input pairs, the multiplexer includes a control sub-circuit having a selection switch.

U.S. Pat. No. 6,194,950 (Kibar, et al.) "High-Speed CMOS Multiplexer" shows a high speed CMOS multiplexer constructed only with pass gates and inverters for simple fabrication and higher speed operation.

U.S. Pat. No. 6,239,646 (Navabi, et al.) "High-Speed Multiple-Input Multiplexer Scheme" describes a high speed, multiple-input multiplexer method.

BRIEF SUMMARY OF THE INVENTION

It is the objective of this invention to provide a circuit for very high-speed multiplexers.

It is further an objective of this invention to provide a circuit that provides an arbitrary number of multiple signal multiplexers.

It is further an objective of this invention to provide a circuit and a method which converts a parallel data bus into a serial data path.

The objectives of this invention are achieved by a circuit and a method for providing any arbitrary number of multiple signal multiplexers. This multiplexer circuit contains an overlapped data generator, which takes in a data bus and outputs even and odd signals to a selective mux. It also contains a selective mux, which receives even and odd internal data bits from said overlapped data generator and which outputs one serial data bit. It also contains a phase locked loop/delay locked loop, PLL/DLL, which receives a set of phase clocks and which outputs five evenly-phase-distributed clock signals to a data select signal generator. Finally, the circuit also includes a data select signal generator, which receives said five evenly-phase-distributed clock signals and which generates a ten-bit data select signal bus. The multplexer of this invention contains an overlapped data generator which takes in n-bit bytes of data where 'n' equals the number of bits per byte. The input bus of this overlapped data generator changes bytes every clock cycle. This invention contains the changing bytes on the input data bus of the overlapped data generator. These bytes have even bytes distributed to an even byte output bus of said overlapped data generator and odd bytes distributed to an odd byte output bus. The circuit of this invention has the overlapped data generator's even byte bus data and the odd byte bus data have overlapping data valid times. This invention contains a phase-locked loop/delay-locked loop, PLL/DLL which develops clocks, which are 1/n of the transmission data rate where n=number of bits in parallel. The data select signal generator of this invention generates 2n data select lines whose active times overlap the adjacent data select lines' active times, where n equals the number of input bits to the data select signal generator. The selective mux logic block controls the serialization of the n-bits of even and odd data bits; into a single data out bit. The n-bits of parallel data input represent a simultaneous set of bits or packet of bits, which are active for a single clock cycle, or data byte transmission time. The n-primary inputs represent 'n' different phase clocks whose individual active times are non-overlapping and which occupy 1/n of the data byte transmission time. The PLL/DLL utilizes the rising edge of time phase clock signals to eliminate any duty cycle requirements and allow very high-speed operation. The single bit primary output contains n bits of serial data, which are contained in said single clock cycle or said data byte transmission time.

BRIEF DESCRIPTION OF THE DRAWINGS

FIG. 1a shows a prior art transmission gate implementation of a multiplexer.

FIG. 1b shows a prior art gate implementation of a multiplexer.

DETAILED DESCRIPTION OF THE INVENTION

Figure 2:
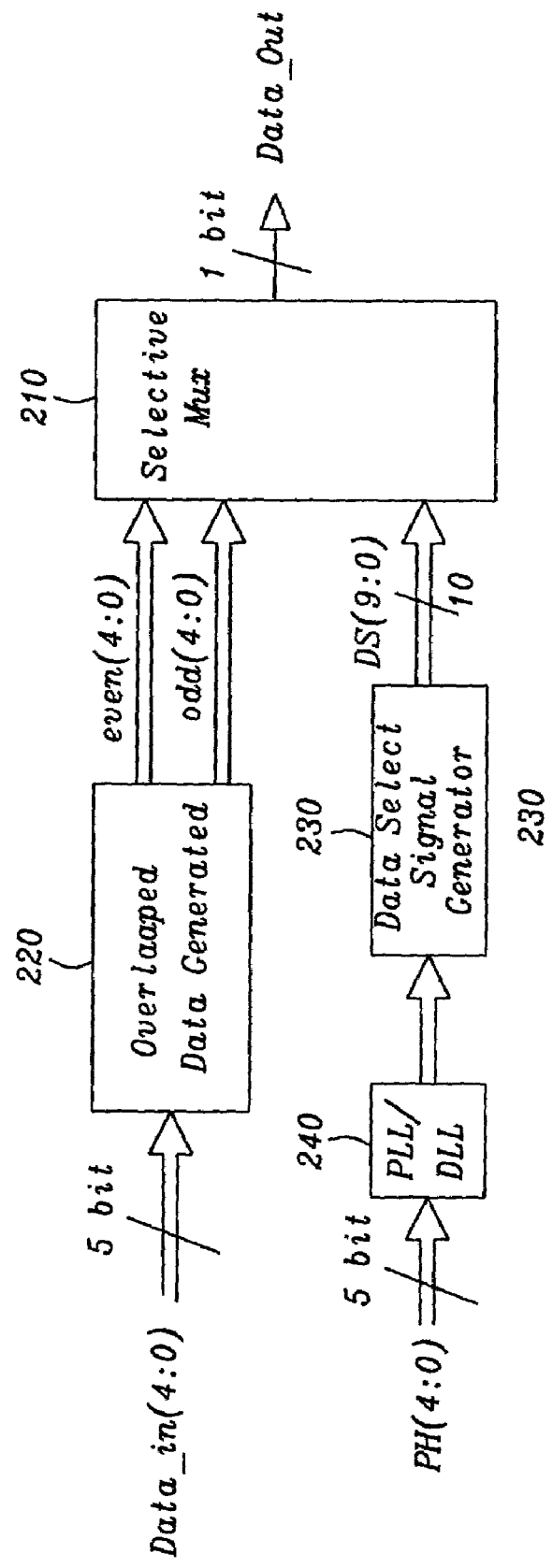
FIG. 2 shows a circuit diagram which illustrates the modified high voltage tolerance, HVT I/O techniques of this invention.

FIG. 2 shows a block diagram of the main embodiment of this invention. The diagram shows a 5-bit Data In bus Data-In [4:0]. It also shows five phase clocks, PH [4:0]. The five phase clocks, PH [4:0] go into the phase-locked loop/delay-locked loop, PLL/DLL, 240. The PLL/DLL block 240 generates five evenly-phase-distributed clock signals. These five PLL/DLL outputs feed into the data select signal generator 230. The data select signal generator 230 generates 10 data select signals, which overlap the adjacent signals in loop style. These 10 select signals DS [9:0] will feed into the selective mux 210.

Figure 4:
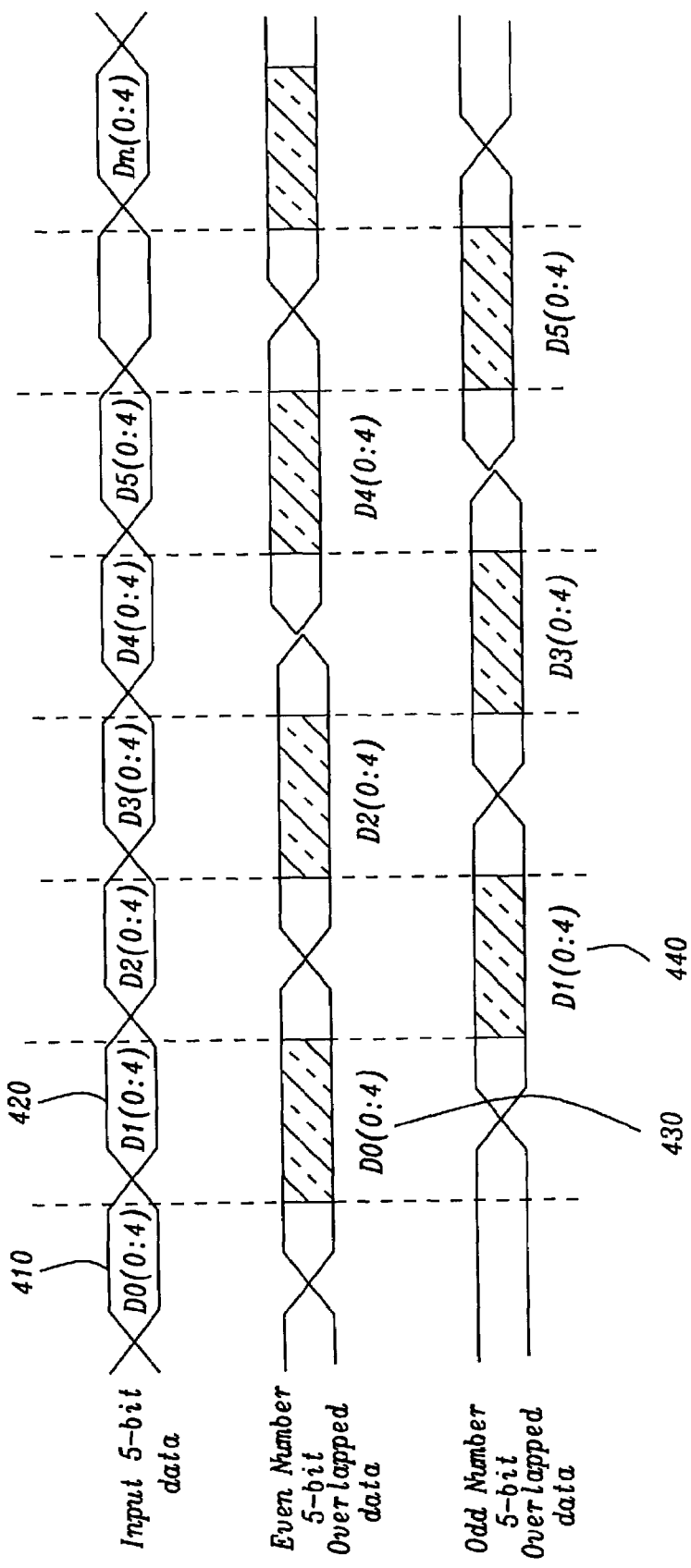
FIG. 4 shows a timing diagram of the phase clocks used in this invention.

The Data_In [4:0] bus feeds into the overlapped data generator 220. The outputs of this generator 220 are two 5-bit overlapped data, which corresponds to the even number of data & odd number of data. FIG. 4 shows the Input 5-bit data. The even byte of input data, D0 [4:0] is followed by the odd byte D1 [4:0]. The even byte bus and the odd byte bus out of the overlapped generator 220 are shown in FIG. 2.

The combination of these two data buses out of the overlapped data generator 220 and the ten data select signals out of the data select signal generator 230 takes place in the selective mux block 210. The output of the selective mux is a 1-bit serial output labeled Data_Out.

Figure 3:
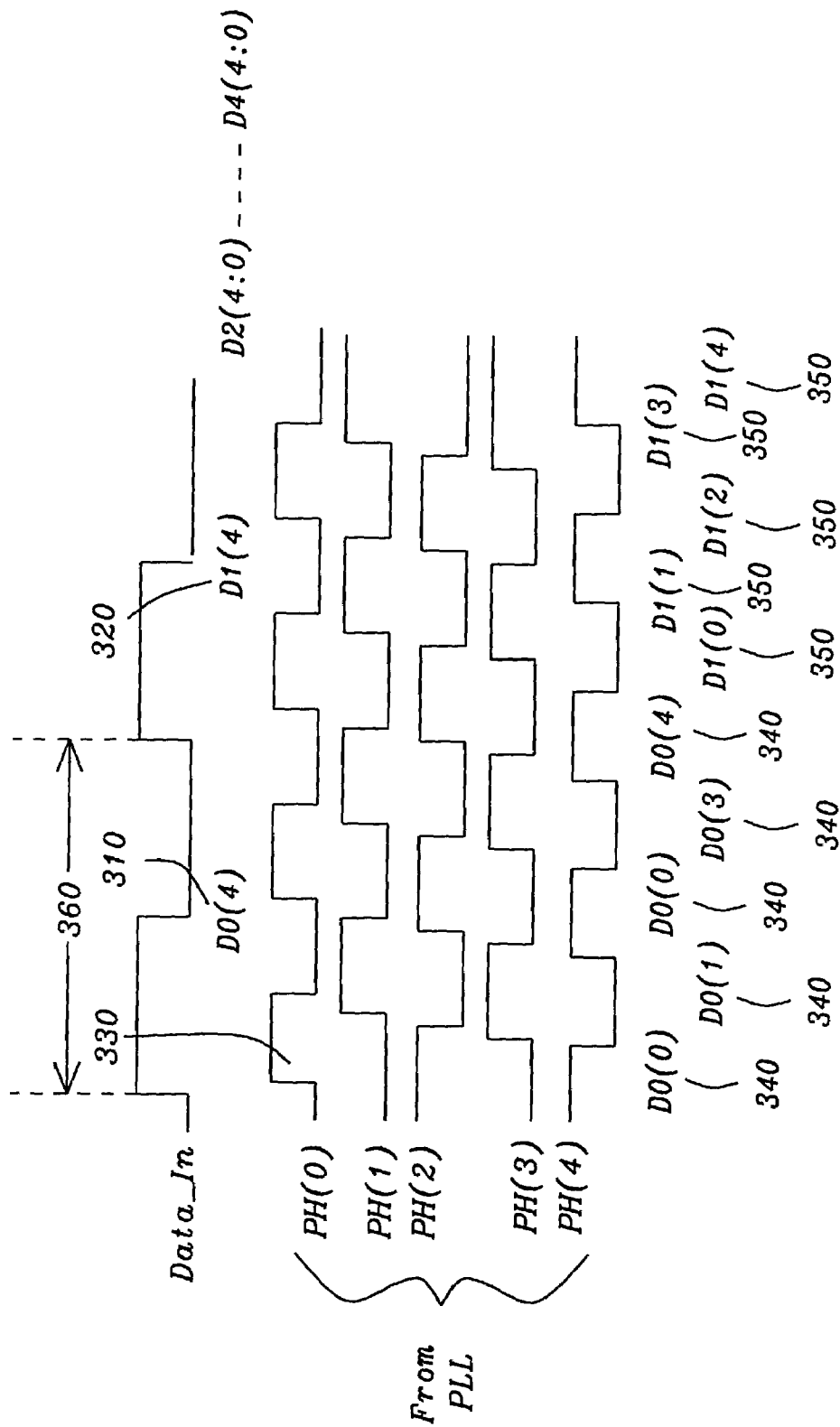
FIG. 3 shows a block diagram of the main embodiment of this invention.

FIG. 3 shows the five phase clocks PH [4:0], which feed the PLL/DLL block 240. FIG. 3 also shows the ten time periods 340, 350 associated with the ten data select signals, which come out of the data select signal generator block 230. FIG. 3 also shows the data transmission time 360 allotted for the D0 data byte 310 and for the D1 data byte 320.

Figure 5:
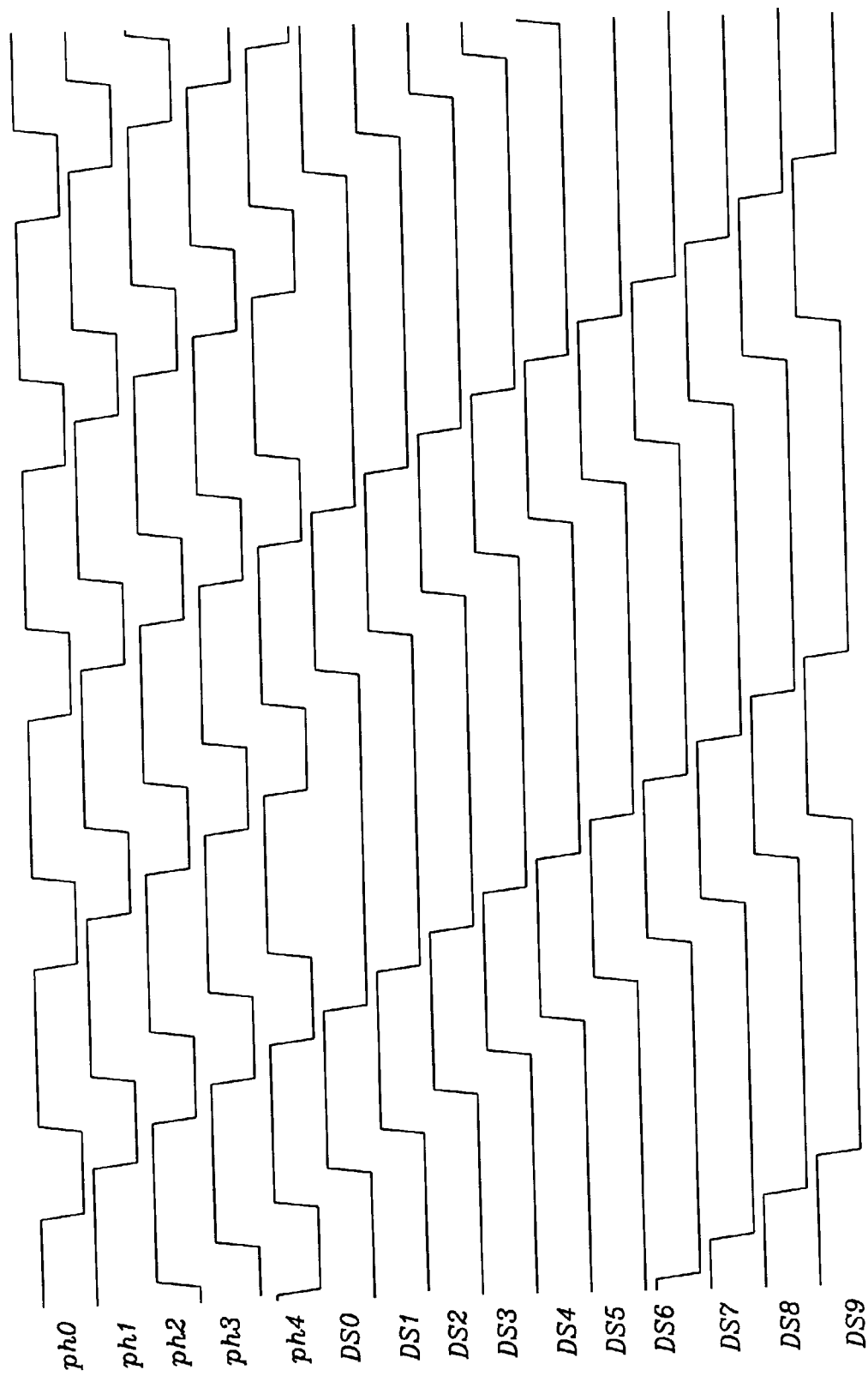
FIG. 5 provides a timing diagram of the phase clocks and the developed data select signals of this invention.

FIG. 5 shows the five outputs, which come out of the PLL/DLL block 240 in FIG. 2. These are the five evenly-phase-distributed clock signals Ph0, Ph1, Ph2, Ph3, and Ph4. Next, FIG. 5 shows the ten data select signals DS [9:0], which come out of the data select signal generator 230 in FIG. 2.

Figure 6:
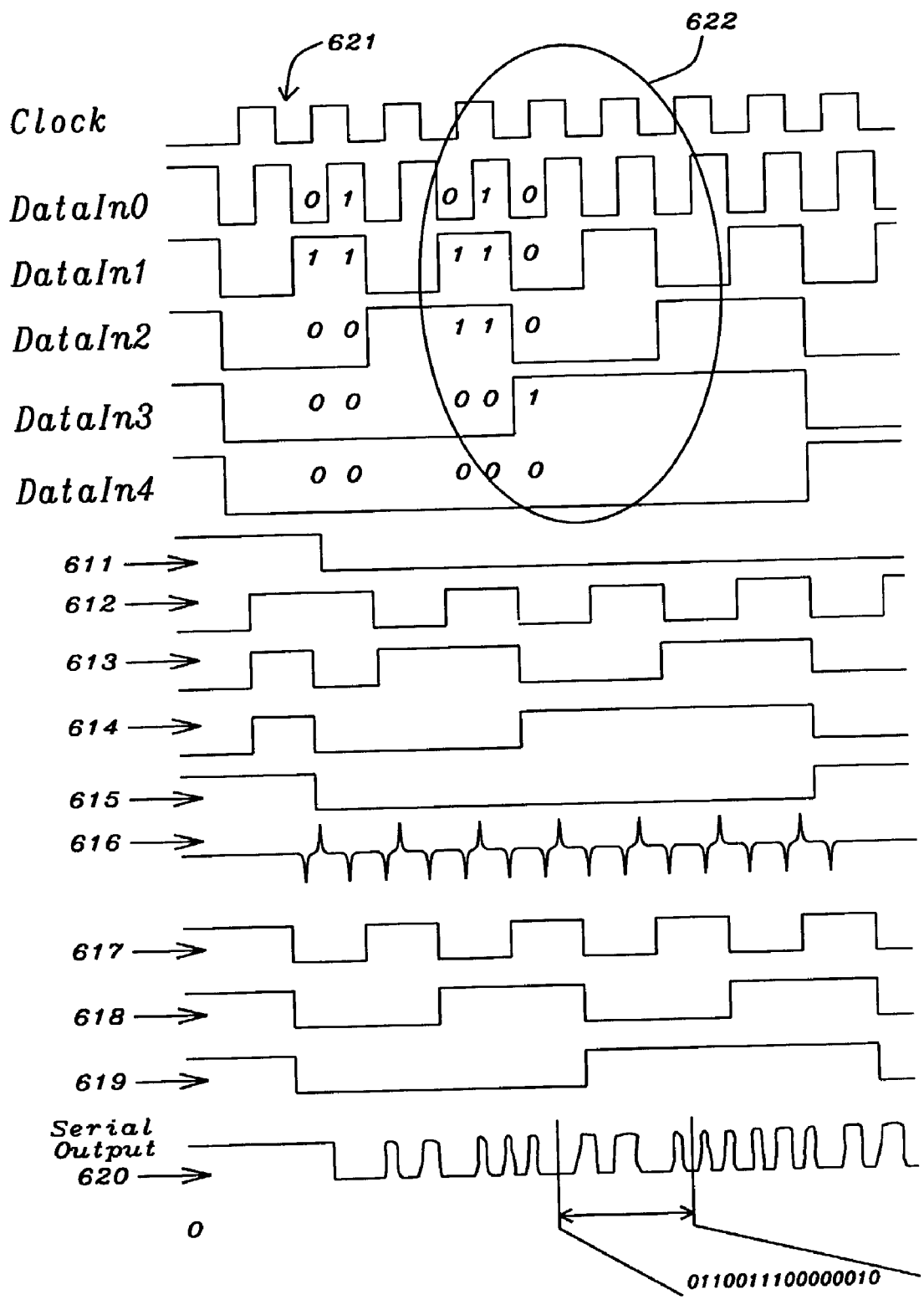
FIG. 6 illustrates an actual data transmission example using the methods of this invention.

FIG. 6 shows an actual data transmission example for this invention. The basic clock is shown. A single clock cycle 621 is shown. Next, a 5-bit byte Data In [4:0] of data is shown. The data example begins with the three clock cycles circled 622. The objective of the multiplexer of this invention is to serialize the five bits in byte D0 first, followed by a serialization of the five bits in byte D1. This is then followed by a serialization of the five bits in byte D2. As can be seen in FIG. 6, byte 0 serialized is '01100'. This represents Data In bit 0, bit 1, bit 2, bit 3 and bit 4 respectively. Similarly, byte 1 serialized is '11100'. Similarly, byte 2 serialized is '00010'.

Nine of the ten bits of intermediate data 611-619 are shown. These bits come out of the overlapped data generator 220 and which feed into the selective mux block 210 in FIG. 2. Finally, the serialized output of the selective mux 210 is shown in FIG. 6. As can be seen by the circled data 620, the three bytes listed in our example above have been successfully serialized. The serialized data result is '011001110000010' as shown in FIG. 6. This result 620 agrees with the input data 622.

There are several advantages of this invention. All of these advantages result from solving the following problems in the time domain. First, there is no requirement for a strict 50% duty cycle clock to avoid mismatches between the rise time logic activation and the fall time logic activation. In this invention, data is sampled at the center of either the even number data or the odd number data as can be seen in FIG. 4. Secondly, the multi-stage phase-locked loop/delay-locked loop, PLL/DLL is only required to generate 1/n of the frequency of the data transmission rate. Third, the n-bits of data per input byte are converted into 2n bits of half speed data, the even and odd overlapped data bytes shown in FIG. 4. These two parallel channels or logic paths for alternating bytes of odd and even data allow the avoidance of glitches at transition time and at data sampling time. Each of the 2n bits has a two bit time period. For example in FIG. 5, DS0 rises at phase0 clock's [Ph(0)] rises edge, DS0 falls at phase2 clock's rising edge.

These slower frequency requirements can easily be implemented in CMOS technology. As a result, the overall multiplexer can be operated at a faster speed without the excessive circuit design concerns of the prior art multiplexer implementations.

While this invention has been particularly shown and described with Reference to the preferred embodiments thereof, it will be understood by those Skilled in the art that various changes in form and details may be made without Departing from the spirit and scope of this invention.

What is claimed is:

1. A very high speed arbitrary number of multiple signal multiplexer circuit comprising:
   an overlapped data generator, which takes in n-bits of parallel data on an input data bus and outputs even and odd signals to a selective mux,
   said selective mux, which receives even and odd internal data bits from said overlapped data generator and which outputs one single bit primary output,
   a phase locked loop/delay locked loop, PLL/DLL, which receives a set of n-primary input phase clocks and which outputs n evenly-phase-distributed clock signals to a data select signal generator, and
   said data select signal generator, which receives said n evenly-phase-distributed clock signals and which generates a ten-bit data select signal bus wherein said overlapped data generator, said selective mux, said phase locked loop/delay locked loop, and said data select generator are used to facilitate the time domain design of said multiple signal multiplexed circuit.

2. The very high speed arbitrary number of multiple signal multiplexed circuit of claim 1 wherein said overlapped data generator takes in n-bit bytes of data where 'n' equals the number of bits per byte.

3. The very high speed arbitrary number of multiple signal multiplexed circuit of claim 1 wherein said input data bus of said overlapped data generator has changing bytes every clock cycle.

4. The very high speed arbitrary number of multiple signal multiplexer circuit of claim 3 wherein said changing bytes on said input data bus of said overlapped data generator have even bytes distributed to an even byte output bus of said overlapped data generator.

5. The very high speed arbitrary number of multiple signal multiplexer circuit of claim 3 wherein said changing bytes on said input data bus of said overlapped data generator have odd bytes distributed to an odd byte output bus of said overlapped data generator.

6. The very high speed arbitrary number of multiple signal multiplexer circuit of claim 1 wherein said overlapped data generator's even byte bus data and said odd byte bus data have overlapping data valid times.

7. The very high speed arbitrary number of multiple signal multiplexer circuit of claim 1 wherein said phase-locked loop/delay-locked loop, PLL/DLL develops clocks, which are 1/n of the transmission data rate where n=number of bits in parallel.

8. The very high speed arbitrary number of multiple signal multiplexer circuit of claim 1 wherein said data select signal generator generates 2n data select lines whose active times overlap said adjacent data select lines' active times, where n equals the number of input bits to said data select signal generator.

9. The very high speed arbitrary number of multiple signal multiplexer circuit of claim 1 wherein said selective mux controls the serialization of said n-bits of even and odd data bits; into a single data out bit.

10. The very high speed arbitrary number of multiple signal multiplexer circuit of claim 9 wherein said n-bits of parallel data on said input data bus represent a simultaneous set of bits or packet of bits, which are active for a single clock cycle, or data byte transmission time.

11. The very high speed arbitrary number of multiple signal multiplexer circuit of claim 1 wherein said n-primary input phase clocks represent 'n' different phase clocks whose individual active times are non-overlapping and which occupy 1/n of said data byte transmission time.

12. The very high speed arbitrary number of multiple signal multiplexer circuit of claim 1 wherein said PLL/DLL utilizes the rising edge of time phase clock signals to eliminate any duty cycle requirements and allow very high-speed operation.

13. The very high speed arbitrary number of multiple signal multiplexer circuit of claim 1 wherein said single bit primary output contains n bits of serial data, which are contained in said single clock cycle or said data byte transmission time.

14. A method of developing a very high speed arbitrary number of multiple signal multiplexer circuit comprising the steps of:
 providing an overlapped data generator, which takes in n-bits of parallel data on an input data bus and outputs even and odd signals to a selective mux,
 providing said selective mux, which receives even and odd internal data bits from said overlapped data generator and which outputs one single bit primary output,
 providing a phase locked loop/delay locked loop, PLL/DLL, which receives a set of n-primary input phase clocks and which outputs n evenly-phase-distributed clock signals to a data select signal generator, and
 providing said data select signal generator, which receives said n evenly-phase-distributed clock signals and which generates a ten-bit data select signal bus wherein said overlapped data generator, said selective mux, said phase locked loop/delay locked loop, and said data select generator are used to facilitate the time domain design of said multiple signal multiplexer circuit.

15. The method of developing a very high speed arbitrary number of multiple signal multiplexer circuit of claim 14 wherein said overlapped data generator takes in n-bit bytes of data where 'n' equals the number of bits per byte.

16. The method of developing a very high speed arbitrary number of multiple signal multiplexer circuit of claim 14 wherein said input data bus of said overlapped data generator has changing bytes every clock cycle.

17. The method of developing a very high speed arbitrary number of multiple signal multiplexer circuit of claim 16 wherein said changing bytes on said input data bus of said overlapped data generator have even bytes distributed to an even byte output bus of said overlapped data generator.

18. The method of developing a very high speed arbitrary number of multiple signal multiplexer circuit of claim 16 wherein said changing bytes on said input data bus of said overlapped data generator have odd bytes distributed to an odd byte output bus of said overlapped data generator.

19. The method of developing a very high speed arbitrary number of multiple signal multiplexer circuit of claim 14 wherein said overlapped data generator's even byte bus data and said odd byte bus data have overlapping data valid times.

20. The method of developing a very high speed arbitrary number of multiple signal multiplexer circuit of claim 14 wherein said phase-locked loop/delay-locked loop, PLL/DLL develops clocks, which are 1/n of the transmission data rate where n=number of bits in parallel.

21. The method of developing a very high speed arbitrary number of multiple signal multiplexer circuit of claim 14 wherein said data select signal generator generates 2n data select lines whose active times overlap said adjacent data select lines' active times, where n equals the number of input bits to said data select signal generator.

22. The method of developing a very high speed arbitrary number of multiple signal multiplexer circuit of claim 14 wherein said selective mux controls the serialization of said n-bits of even and odd data bits; into a single data out bit.

23. The method of developing a very high speed arbitrary number of multiple signal multiplexer circuit of claim 22 wherein said n-bits of parallel data on said input data bus represent a simultaneous set of bits or packet of bits, which are active for a single clock cycle, or data byte transmission time.

24. The method of developing a very high speed arbitrary number of multiple signal multiplexer circuit of claim 14 wherein said n-primary input phase clocks represent 'n' different phase clocks whose individual active times are non-overlapping and which occupy 1/n of said data byte transmission time.

25. The method of developing a very high speed arbitrary number of multiple signal multiplexer circuit of claim 14 wherein said PLL/DLL utilizes the rising edge of time phase clock signals to eliminate any duty cycle requirements and allow very high speed operation.

26. The method of developing a very high speed arbitrary number of multiple signal multiplexer circuit of claim 14 wherein said single bit primary output contains n bits of serial data, which are contained in said single clock cycle or said data byte transmission time.

* * * * *